United States Patent
Johnson, Jr. et al.

[19]

[11] Patent Number: 5,862,599
[45] Date of Patent: Jan. 26, 1999

[54] TAG PUNCH SYSTEM

[76] Inventors: Donald C. Johnson, Jr.; Clemon Johnson, Jr., both of Rural Rte. 4 Box 4088 Hwy. 90 W., Monticello, Fla. 32344

[21] Appl. No.: 637,449

[22] Filed: Apr. 25, 1996

[51] Int. Cl.⁶ .................................................. B26F 1/04
[52] U.S. Cl. ............................................... 30/364; 30/363
[58] Field of Search ........................ 30/363, 364; 83/552

[56] References Cited

U.S. PATENT DOCUMENTS

| | | | |
|---|---|---|---|
| 385,897 | 7/1888 | Yates | 30/364 |
| 390,457 | 10/1888 | Cook | 30/363 |
| 544,227 | 8/1895 | Hoff et al. | 83/552 |
| 1,391,890 | 9/1921 | Green | 30/364 |
| 1,476,273 | 12/1923 | Swanson | 30/363 X |
| 1,504,598 | 8/1924 | Bergen | 83/552 X |
| 1,529,887 | 3/1925 | Harris et al. | 30/364 X |
| 2,449,839 | 9/1948 | Brittle | 30/363 |
| 3,605,310 | 9/1971 | Brown | 40/301 |
| 3,641,804 | 2/1972 | Oudenhoven | 72/409 |
| 4,265,876 | 5/1981 | Foakins | 424/28 |
| 4,597,208 | 7/1986 | Chevillot | 40/301 |
| 4,612,877 | 9/1986 | Hyaes et al. | 119/156 |
| 4,718,374 | 1/1988 | Hayes | 119/156 |
| 5,495,671 | 3/1996 | Shun-Yi | 30/364 |

FOREIGN PATENT DOCUMENTS

| | | | |
|---|---|---|---|
| 547391 | 9/1932 | Germany | 30/364 |

*Primary Examiner*—Eugenia Jones
*Attorney, Agent, or Firm*—Peter Loffler

[57] ABSTRACT

A tag punch system for punching symbols into livestock identification tags or other target materials comprises a handle system, a pressure positioning system located on a first handle of the handle system, and a punching system located on a second handle of the handle system. The punching system has one or more stencil chains, having a plurality of user-selectable stencils. A target material is positioned and secured over a slider stencil of the pressure positioning system, a desired stencil is selected and brought into position, and the two handles are squeezed together causing the stencil symbol to be punched into the target material.

6 Claims, 5 Drawing Sheets

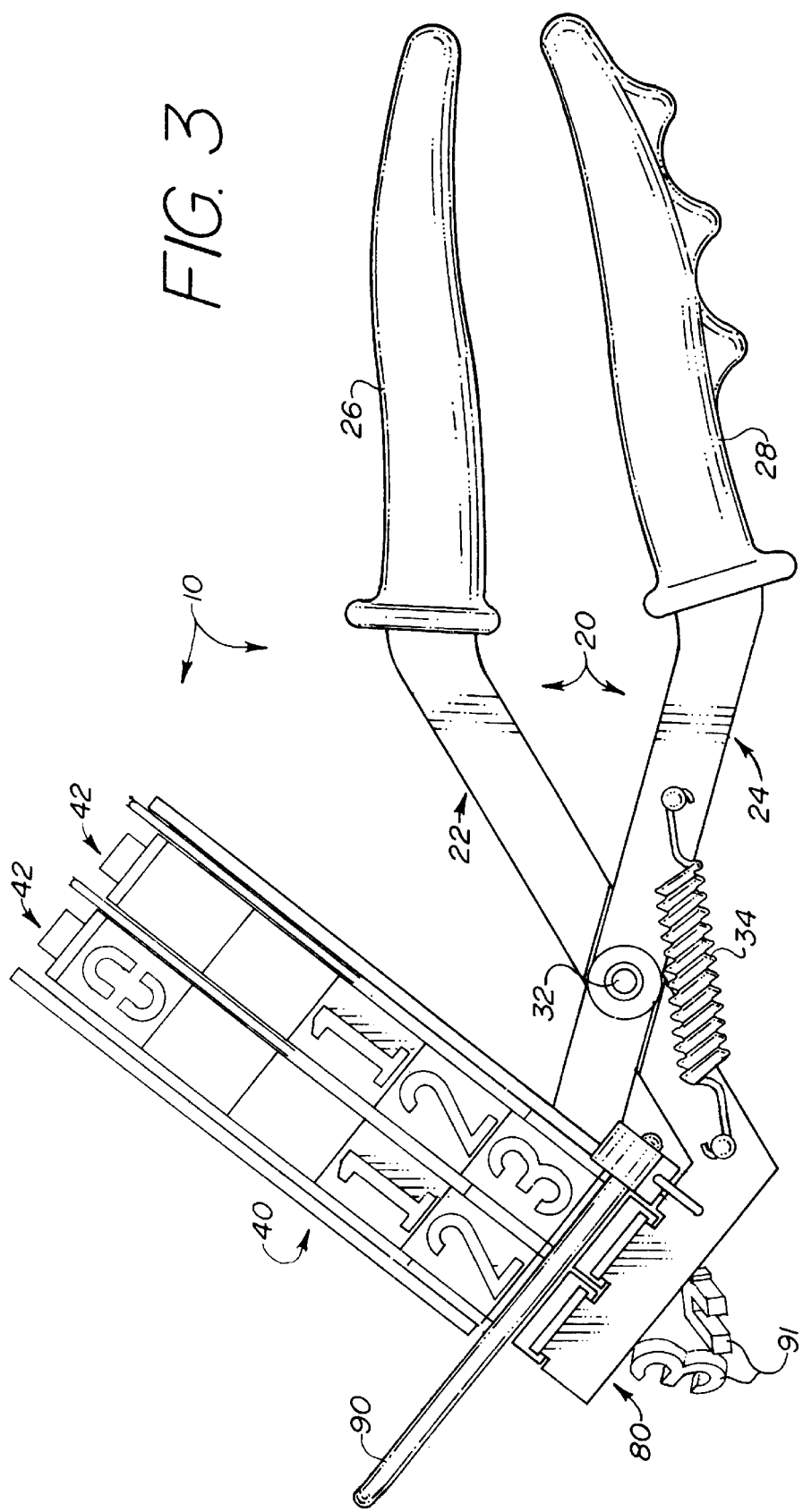

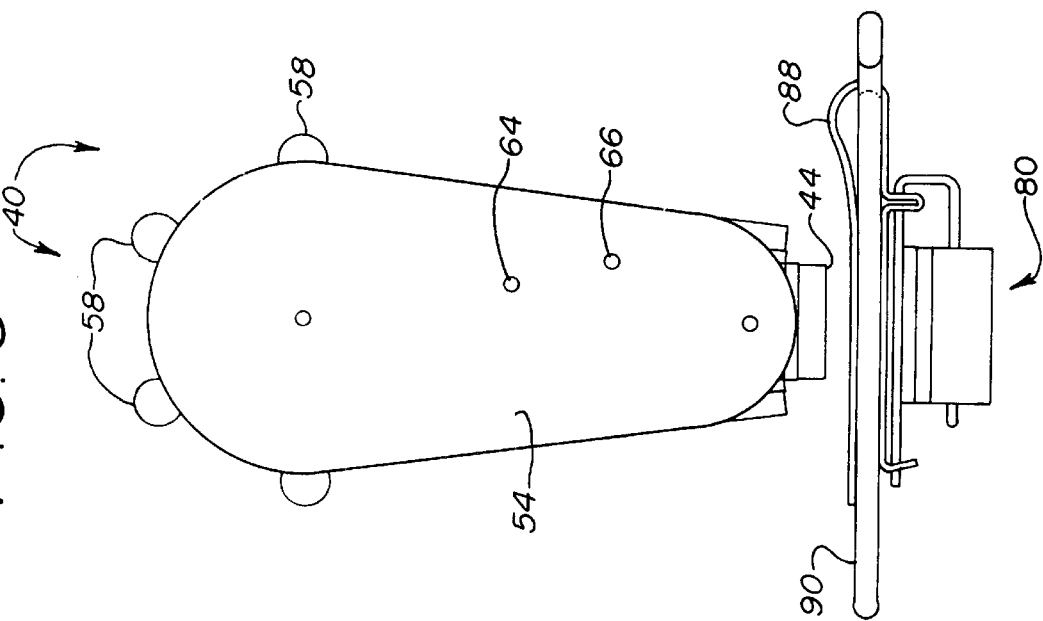
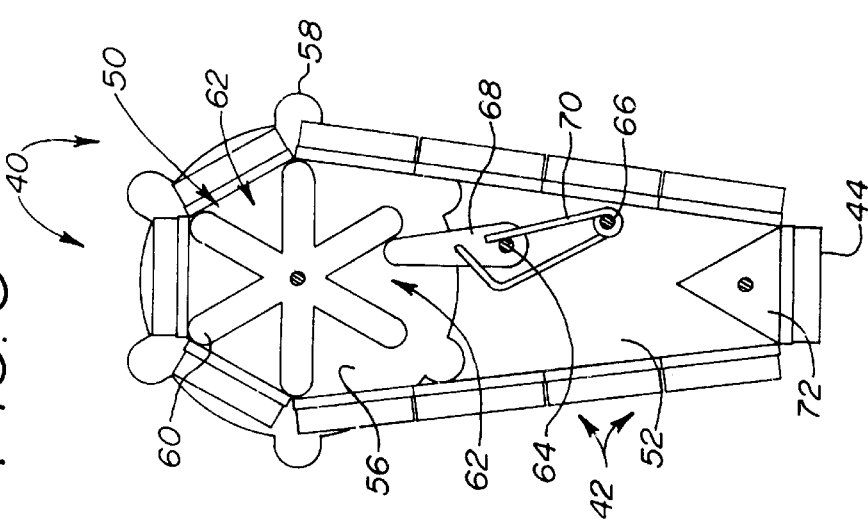
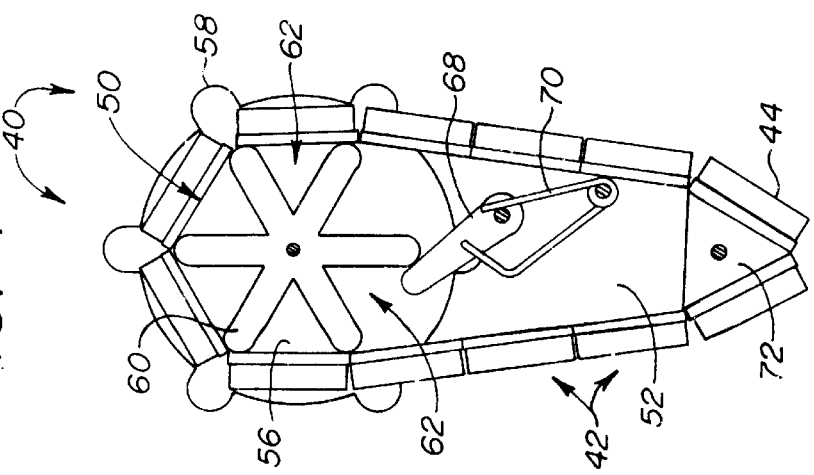

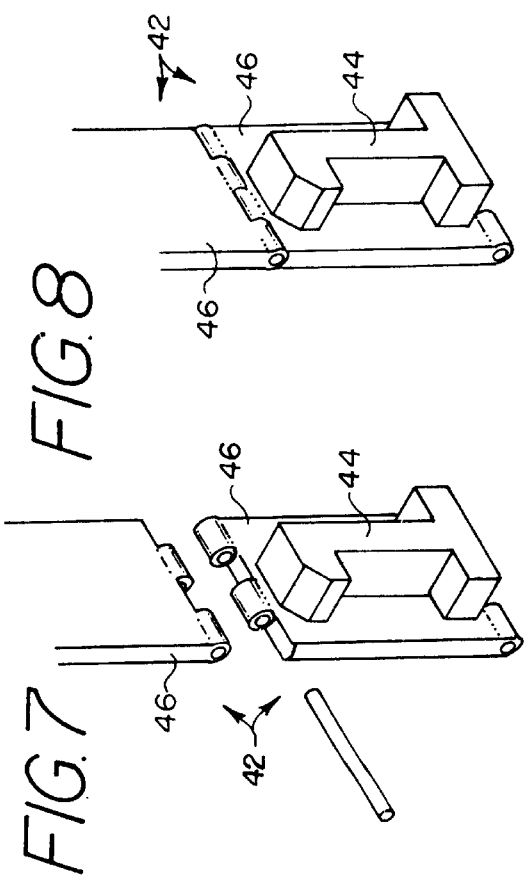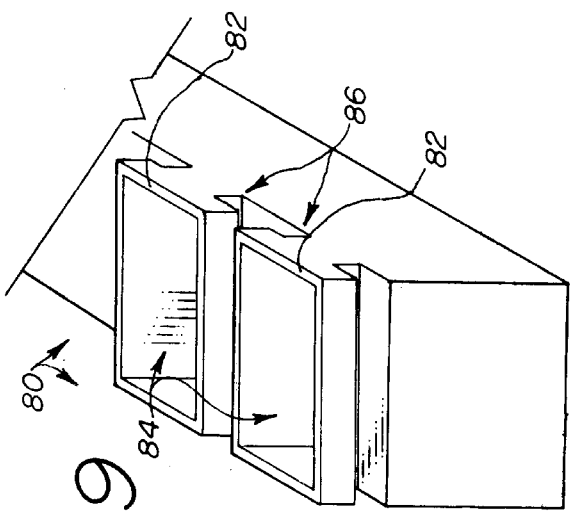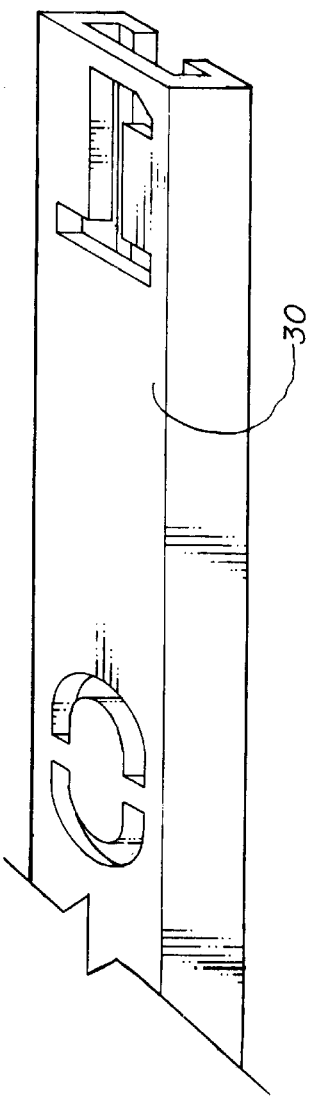

TAG PUNCH SYSTEM

BACKGROUND OF THE INVENTION

1. Field of the Invention

The present invention relates to a tag punch system for producing tags to be attached to livestock and the like.

2. Background of the Prior Art

Cattle and other livestock are labeled or otherwise tagged with an identification number. This number serves as part of an accounting system for the owner and also serves to identify the owner of the livestock should the livestock become loose or otherwise become separated from the owner. Furthermore, the identification tag is an invaluable aid at livestock auctions where the hectic pace makes livestock identification tags a necessary item for smooth functioning of the sales operation.

Livestock tags generally take one of two methods. One method of identifying livestock is to place a "waterproof" identification mark into the livestock's ear. Such a method is relatively permanent and accomplishes the identification process well. However, such a method suffers from certain drawbacks. First, the waterproof ink used to make the waterproof mark tends to fade in hot and humid climates such as those found in the major livestock regions of Florida, Texas, Argentina, and others. The mark will either fade or blur making proper identification of the livestock impossible. Furthermore, such marking systems are restricted to the size of the livestock ear. As such, a person desiring to identify the mark must be in close proximity to the livestock in order to ascertain the nature of the mark. Such a system proves inefficient.

A second type of livestock identification method is to place a tag into the ear of the livestock. The tag, which is created beforehand, is clipped or otherwise pierced into the ear and permanently remains attached to the ear. The tag can be created from material that is relatively immune to the effects of the heat and humidity of major livestock producing regions. This type of livestock identification system works relatively well. However, it is not without drawbacks. The current tag systems that are placed onto livestock are difficult and expensive to produce. Such systems require that the particular identification number to be produced, be requisitioned well in advance. Any change in the number is cumbersome.

A livestock identification system is needed that can be attached to livestock in order to specifically identify that particular item of livestock. Such a system must be immune to the heat and humidity that is found in many livestock producing regions around the globe. Furthermore, such a system must be relatively simple and straightforward to use and must be able to quickly produce unique identification numbers at the discretion of the user of the device. Preferably, such a system should be simple and straightforward to manufacture.

SUMMARY OF THE INVENTION

The tag punch system of the present invention meets the above-stated needs in the art. The tag punch system permits a user to produce a tag bearing a user-desired symbol or series of symbols for attachment to the livestock. The device permits the user to select target material that will withstand extremes in temperature and humidity and can even include target material that has pesticidally active attributes as found in the art. The target material and the symbols placed thereon can be of appropriate size and can be appropriately positioned for maximum user efficiency. Pre-ordering of identification-marked tag material is no longer required.

The tag punch system of the present invention comprises a handle system, a punching system located on one handle of the handle system and a pressure positioning system located on the other handle of the handle system. The two handles are crossed over one another and pinned together and operate in scissor-like fashion. A tension coil spring holds the handles in a normally open position.

The punching system comprises a series of stencils, having raised male protrusion symbols located thereon, chained together to form a closed loop stencil chain. The stencil chain encompasses the outer periphery of a chain advancement subsystem. The chain advancement subsystem comprises a pair of generally coextensive plates. A rotating wheel having an extended sleeve with finger slots, and a notched advancement wheel are rotatably disposed between the two plates. A spring-biased motion stop engages one of the notches of the advancement wheel and inhibits free rotation of the advancement wheel. A triangle-shaped stabilizer wheel holds the chain steady.

The pressure positioning system comprises a press plate, a slider track, a slider stencil, having the female counterpart of the male protrusion symbols slidably disposed on the slider track, and a clamp.

Target material is positioned by the slider track such that the area to be punched by a selected stencil is positioned over the press plate. The rotating wheel is rotated until the desired stencil is in punch position. The slider stencil is slid into position so that the female counterpart of the stencil is located over the press plate. The handles are squeezed together causing the desired stencil to be pressed into the target material and the slider stencil underneath. The stencil punches or otherwise cleaves the symbol of the stencil onto the target material. Target material residue falls clear of the device. After the punch process is complete, the spring opens the handles and separates the punching system from the pressure positioning system. Thereafter, the target material is repositioned, another stencil is selected and rotated into place, the slider stencil is slid into its new position and the punch process is repeated.

BRIEF DESCRIPTION OF THE DRAWINGS

FIG. 3 is a left side elevation view of the tag punch system of the present invention in a normally closed, punch position.

FIG. 4 is a side elevation view of the stencil chain advancing to the next stencil.

FIG. 5 is a side elevation view of the stencil chain after advancement to the next stencil.

FIG. 6 is a side elevation view of the punching system positioned over the pressure positioning system.

FIGS. 7 and 8 illustrate the attachment of two individual stencils to one another.

FIG. 9 illustrates the slider stencil being received onto the slider track.

Similar reference numerals refer to similar parts throughout the several views of the drawings.

DETAILED DESCRIPTION OF THE PREFERRED EMBODIMENT

The tag punch system 10 of the present invention generally comprises three interacting major systems, the handle system 20, the punching system 40, and the pressure positioning system 80.

Figure 1:
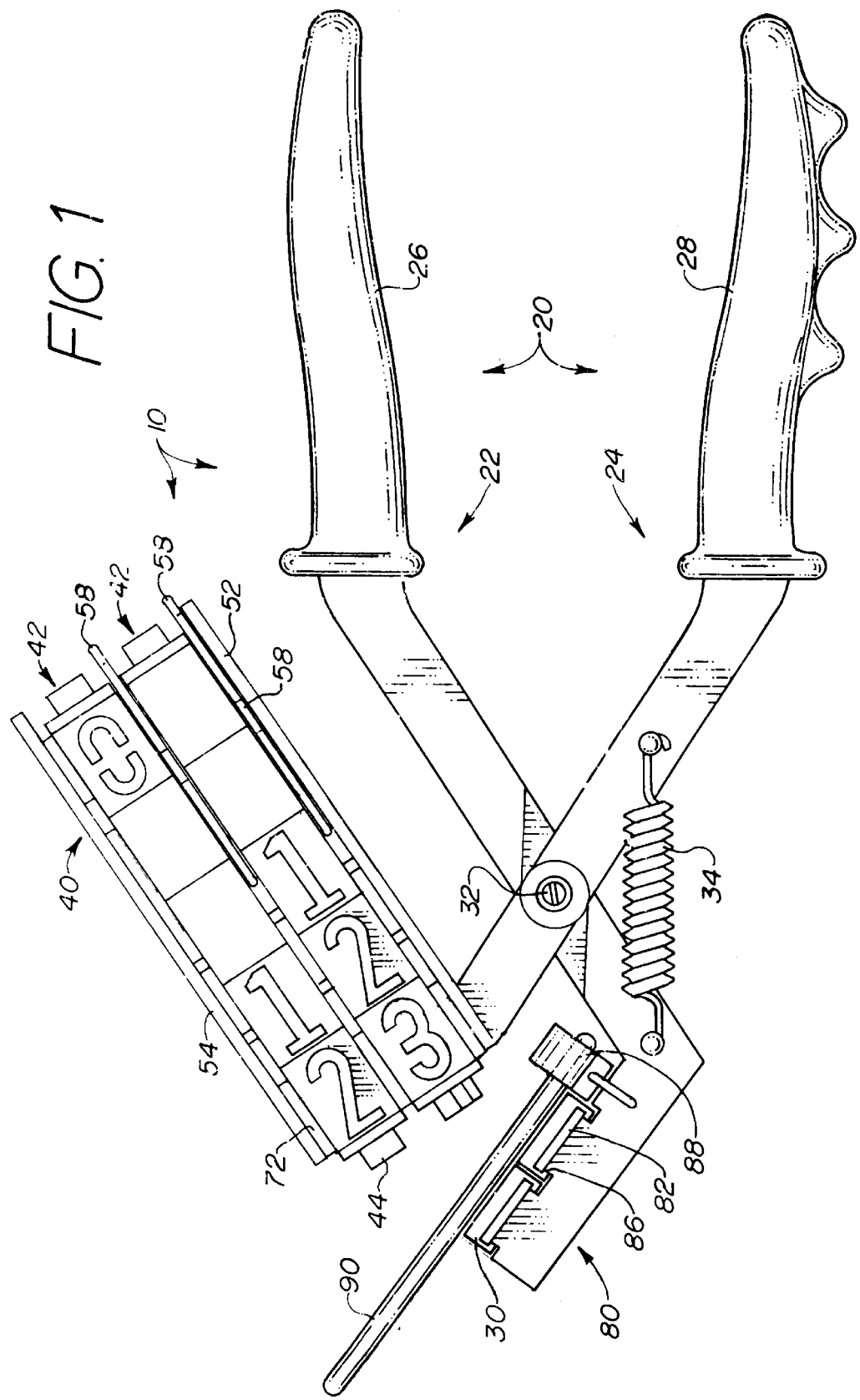
FIG. 1 is a left side elevation view of the tag punch system of the present invention in a normally open position.

As seen in FIG. 1, the handle system 20 comprises a first handle 22 and a second handle 24. Located on one end of the first handle 22 is a hand grip 26 while the pressure positioning system 80 is located on the opposing end. Located on one end of the second handle 24 is a second hand grip 28 while the punching system 40 is located on the opposing end. The two handles 22 and 24 are crossed over one another while a pin 32 connects the two handles 22 and 24 and permits the handles to open and close in scissor-like fashion. A tension coil spring 34 is disposed between the body of the first handle 22 and the body of the second handle 24 and holds the two handles 22 and 24 in a normally open position.

Figure 2:
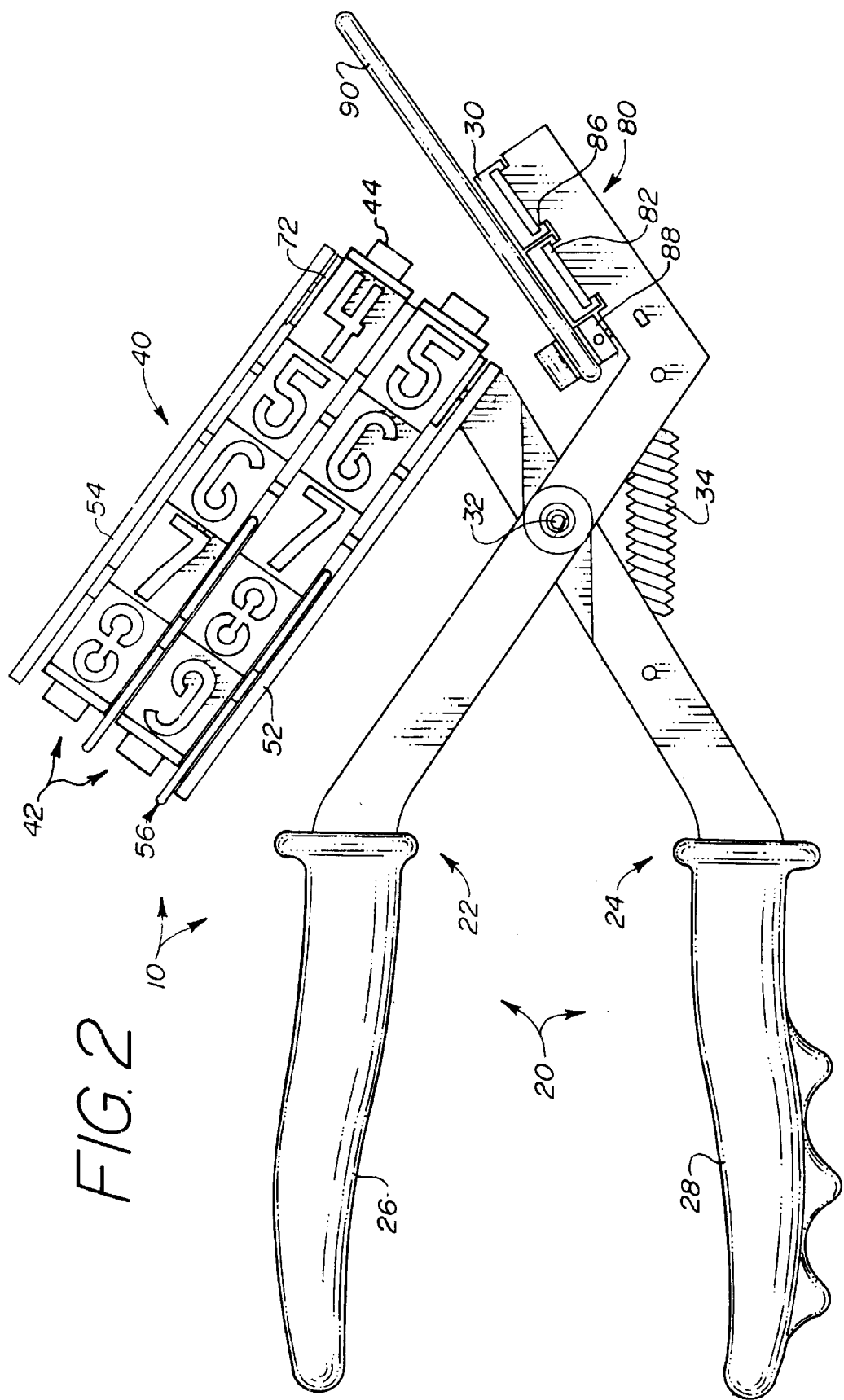
FIG. 2 is a right side elevation view of the tag punch system of the present invention.

As seen in FIG. 2, the punching system 40 comprises a chain of stencils 42 to be used to punch a figure onto a target material. The desired stencil, which can be a number, a letter, or other symbol, is a raised male protrusion that punches or otherwise cleaves the figure into the target material. Several stencils 44 are connected by a lathed collar 46 or other appropriate means and form a closed loop chain 42.

As seen in FIGS. 4 and 5, the stencil chain 42 is disposed on a chain advancement subsystem 50. The chain advancement subsystem 50 comprises a first end plate 52 and a second end plate 54. Rotatably disposed between the first end plate 52 and the second end plate 54 is a rotating wheel 56 having an extended sleeve with finger slots 58 and an advancement wheel 60 having a plurality of notches 62 thereon. A first rod 64 and a second rod 66 extend between the first end plate 52 and the second end plate 54. Located on the first rod 64 is a motion stop 68 which engages one of the notches 62 of the advancement wheel 60 inhibiting free rotation of the advancement wheel 60. Located on the second rod 66 is a spring 70 which engages the motion stop 68 and holds the motion stop 68 in position. A triangular-shaped stabilizer wheel 72 is rotatably disposed between the first end plate 52 and the second end plate 54. The stencil chain 42 encompasses the outer periphery of the advancement wheel 60 and the stabilizer wheel 72. The chain advancement subsystem 50 is attached onto the end of the second handle 24.

As seen in FIG. 5, a side of the stabilizer wheel 72 engages the stencil chain 42 and holds the stencil chain 42 in a fixed position for punching of the figure located on the selected stencil into a target material. In order to select a different stencil, the rotating wheel 56 is rotated until the desired stencil 44 is in the punching position. Rotation of the rotating wheel 56 causes rotation of the advancement wheel 60 which in turn advances the stencil chain. Each time one of the notches 62 of the advancement wheel 60 overcomes the motion stop 68, a new stencil 44 is in the punching position. Furthermore, the stabilizer wheel 72 makes a one-third revolution such that a side of the stabilizer wheel 72 is in direct contact with the stencil chain 42 in order to hold the stencil chain 42 in a steady position for the punching operation.

Although the punching system 40 has been illustrated with two stencil chains 42 on the chain advancement subsystem 50, it is expressly recognized that the punching system 40 can be manufactured with either one stencil chain 42 or three or more stencil chains 42 located thereon without departing from the scope or spirit of the invention. In a multi-chain embodiment, each stencil chain 42 is rotatable independent of the other stencil chains 42. It is further recognized that a different stencil chain advancement subsystem 50 or a different method of stencil selection can be utilized without departing from the scope or spirit of the invention.

The pressure positioning system 80 comprises a press plate 82 having an aperture 84 located within the center of the press plate 82 permitting punched target material residue to pass clear of the device 10. Located on the sides of the press plate 82 is a slider track 86 or other similar device, for slidable positioning of a slider stencil 30 on the slider track 86. The slider stencil 30 has female symbols that correspond to the male symbols on the stencil chain 42. A clamp 88 or other similar device holds the target material steady during the punch process.

In order to utilize the tag punch system of the present invention, target material 90 is positioned such that the area of the target material 90 wherein the first symbol to be punched is located over the press plate 82. The clamp 88 holds the target material 90 in place. Ideally the target material will be a soft or semi-soft material such as plastic or the like, however, other materials will also prove acceptable. The rotating wheel 56 is rotated until the desired stencil 44 is in the punch position. The slider stencil 30 is positioned so that corresponding symbol on the slider stencil 30 is positioned over the press plate 82. Thereafter, the two handles 22 and 24 are squeezed together bringing the punching system 40 toward the pressure positioning system 80. This causes the desired stencil 44 to be pressed into the target material 90 and the slider stencil 30 underneath. The desired stencil 44 punches or otherwise cleaves the symbol located on the desired stencil 44, into the target material 90 assisted by the female die of the slider stencil 30. The punched residue 91 of the target material falls through the aperture 84 and falls free of the device. The spring 34 opens the two handles 22 and 24 and separates the punching system 40 and the pressure positioning system 80 from one another.

Thereafter, the target material 90 is advanced for placement of the next symbol thereon, the stencil chain 42 is rotated for the next desired symbol, and the slider stencil 30 is slid into its next appropriate position. This process continues until the target material 90 is completely punched as desired.

In the illustrated embodiment having two stencil chains on the punching system 40, a desired symbol on each stencil chain 42 is selected as well as on each slider stencil 30, thereby punching two symbols into the target material 90 with each punch.

While the invention has been particularly shown and described with reference to an embodiment thereof, it will be understood by those skilled in the art that various changes in form and detail may be made without departing from the spirit and scope of the invention.

We claim:

1. A tag punch system for punching symbols into target material comprising:

a first handle having a first end, a medial portion, and a second end, a second handle having a first end, a medial portion, and a second end with the medial portion of the second handle attached to the medial portion of the first handle;

a first plate attached to the first handle;

a second plate attached to the first handle in parallel orientation to the first plate;

at least one closed loop chain each having a plurality of stencils with male protrusions thereon, the at least one closed loop chain rotatably disposed between the first plate and the second plate;

at least one rotation wheel having finger slots, the at least one rotation wheel operatively connected to a respective one of the at least one closed loop chain for rotating the respective closed loop chain;

at least one advancement wheel having notches thereon, each advancement attached to wheel a respective one of the at least one rotation wheel and rotatably disposed between the first plate and the second plate, each advancement wheel independently rotatable;

a first rod disposed between the first plate and the second plate;

a second rod disposed between the first plate and the second plate;

at least one motion stop, attached to the first rod, each of the at least one motion stop engaging a respective one of the at least one advancement wheel to inhibit free rotation of the respective advancement wheel;

at least one spring, attached to the second rod, to engage a respective one of the at least one motion stop and to hold the respective motion stop in position; and a triangle-shaped wheel rotatably disposed between the first plate and the second plate for holding one of the at least one closed loop stencil chain in a fixed position;

a press plate, having a central portion, attached to the second end of the second handle;

a slider stencil, having a plurality of female dies in corresponding shape and size to the male protrusion, slidably disposed over the press plate; and wherein when the first end of the first handle is squeezed toward the first end of the second handle the stencil is brought toward and impacts the target material positioned on the slider stencil.

2. The tag punch system as in claim 1 further comprising a first hand grip attached to the first end of the first handle and a second hand grip attached to the first end of the second handle.

3. The tag punch system as in claim 1 further comprising a handle separation means for keeping the second end of the first handle and the second end of the second handle in a normally separated position.

4. The tag punch system as in claim 3 wherein the handle separation means comprises a coil spring.

5. The tag punch system as in claim 1 further comprising a clamp means, located on the second end of the second handle proximately to the press plate for securely holding the target material over the press plate.

6. The tag punch system as in claim 1 wherein the central portion of the press plate is hollow.

\* \* \* \* \*